(12) United States Patent
Slemp

(10) Patent No.: US 7,650,869 B2
(45) Date of Patent: Jan. 26, 2010

(54) ROTARY VALVES AND VALVE SEAL ASSEMBLIES

(76) Inventor: David A. Slemp, 4217 Quimby St., Santa Rosa, CA (US) 95407

( * ) Notice: Subject to any disclaimer, the term of this patent is extended or adjusted under 35 U.S.C. 154(b) by 85 days.

(21) Appl. No.: 11/900,704

(22) Filed: Sep. 12, 2007

(65) Prior Publication Data

US 2008/0066709 A1    Mar. 20, 2008

Related U.S. Application Data

(60) Provisional application No. 60/845,660, filed on Sep. 19, 2006.

(51) Int. Cl.
*F01L 7/16* (2006.01)

(52) U.S. Cl. ............... 123/190.17; 123/190.8

(58) Field of Classification Search ............... 123/59.1, 123/80 BA, 190.1, 190.8, 190.17
See application file for complete search history.

(56) References Cited

U.S. PATENT DOCUMENTS

| | | | |
|---|---|---|---|
| 3,948,227 A | 4/1976 | Guenther | |
| 4,098,514 A | 7/1978 | Guenther | |
| 4,354,459 A | 10/1982 | Maxey | |
| 4,554,890 A | 11/1985 | Okimoto | |
| 4,976,232 A * | 12/1990 | Coates | 123/190.17 |
| 5,081,966 A | 1/1992 | Hansen et al. | |
| 5,105,784 A | 4/1992 | Davis | |
| 5,392,743 A | 2/1995 | Dokonal | |
| 5,410,996 A | 5/1995 | Baird | |
| 5,529,037 A | 6/1996 | Wallis | |
| 5,579,730 A | 12/1996 | Trotter | |
| 5,579,734 A | 12/1996 | Muth | |
| 5,878,707 A | 3/1999 | Ballard | |
| 5,967,108 A | 10/1999 | Kutlucinar | |
| 6,158,465 A | 12/2000 | Lambert | |
| 6,205,960 B1 | 3/2001 | Vallejos | |
| 6,237,556 B1 | 5/2001 | Smith | |
| 6,257,191 B1 | 7/2001 | Kutlucinar | |
| 6,293,242 B1 | 9/2001 | Kutlucinar | |
| 6,308,677 B1 | 10/2001 | Bohach | |
| 6,321,699 B1 * | 11/2001 | Britton | 123/80 R |
| 6,443,110 B2 | 9/2002 | Qattan | |
| 6,578,538 B2 | 6/2003 | Trentham | |
| 6,666,458 B2 * | 12/2003 | Coates | 277/500 |
| 6,718,933 B1 * | 4/2004 | Coates | 123/190.17 |
| 6,880,511 B1 * | 4/2005 | Coates | 123/190.17 |
| 6,976,464 B2 | 12/2005 | Crall | |
| 6,994,067 B2 | 2/2006 | Wallis | |

(Continued)

FOREIGN PATENT DOCUMENTS

WO    WO 2005/119018 A1    12/2005

OTHER PUBLICATIONS

Marcus C. Inman Hunter, Rotary Valve Engines, 1946, pp. 212-214, John Wiley & Sons, Inc., New York.

*Primary Examiner*—Hai H Huynh
(74) *Attorney, Agent, or Firm*—Deanna J. Shirley

(57) ABSTRACT

Novel rotary valve assemblies and valve components for use with an internal combustion engine are disclosed. Valve seal assembly anchors are also described. Selected valve port geometries and axial adjustment for variable valve area for desired engine efficiency and performance are described. Novel seal assemblies and arrangements for sealing and heat transfer are also described.

32 Claims, 9 Drawing Sheets

U.S. PATENT DOCUMENTS

| | | | |
|---|---|---|---|
| 7,134,416 B2 * | 11/2006 | Lawes | 123/190.17 |
| 7,213,546 B2 * | 5/2007 | Vermeer | 123/80 BA |
| 2003/0106517 A1 | 6/2003 | Trentham | |
| 2005/0166885 A1 | 8/2005 | Lawes | |
| 2005/0188940 A1 | 9/2005 | Huff | |

* cited by examiner

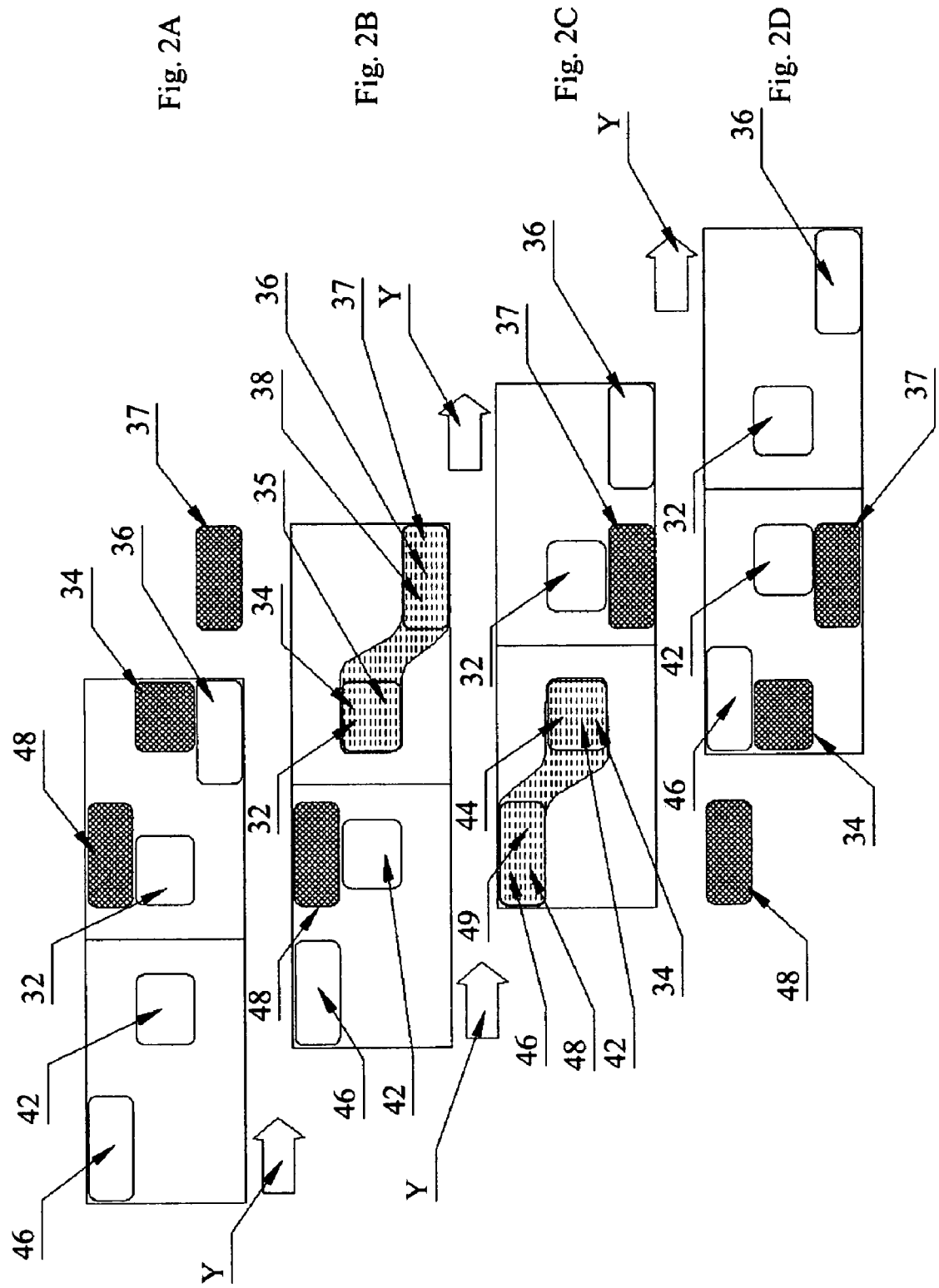

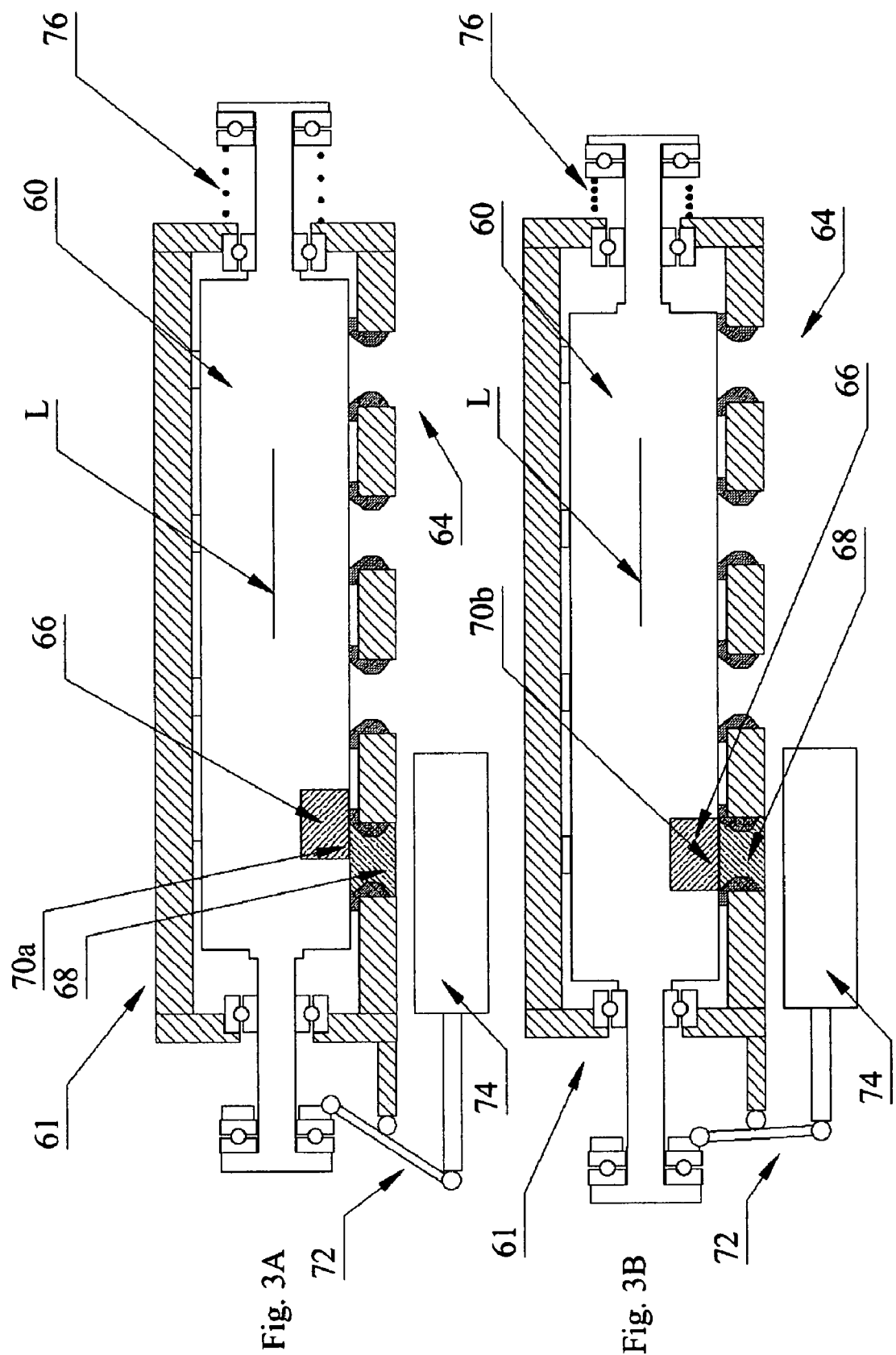

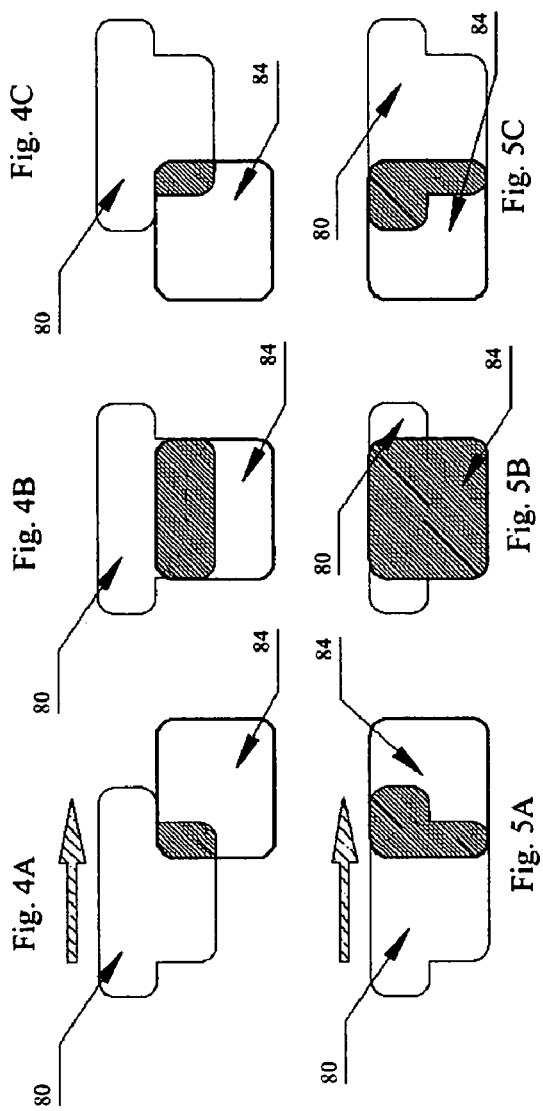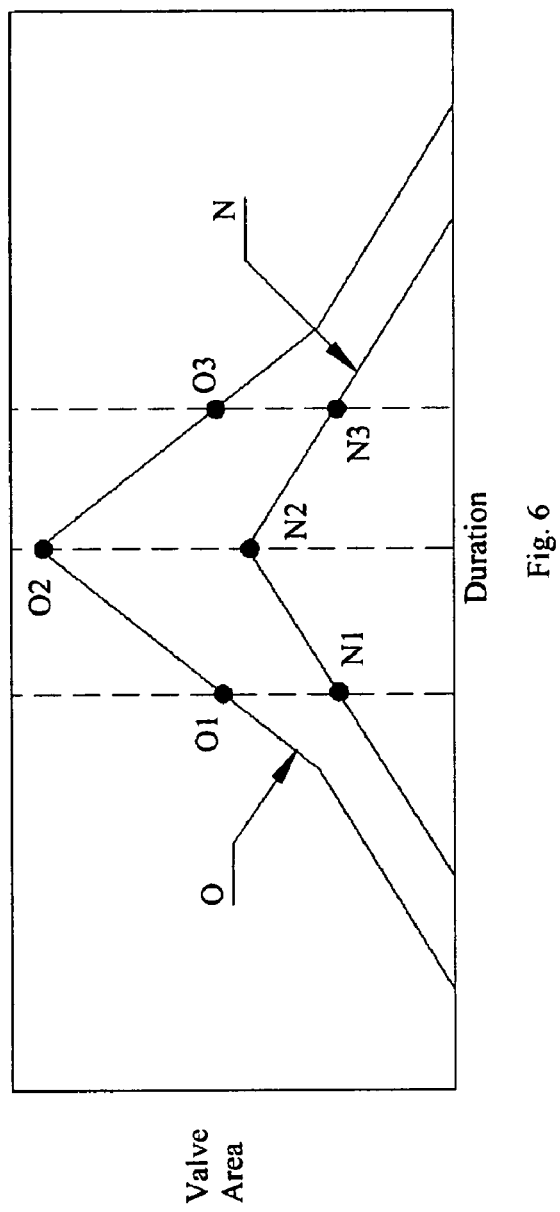

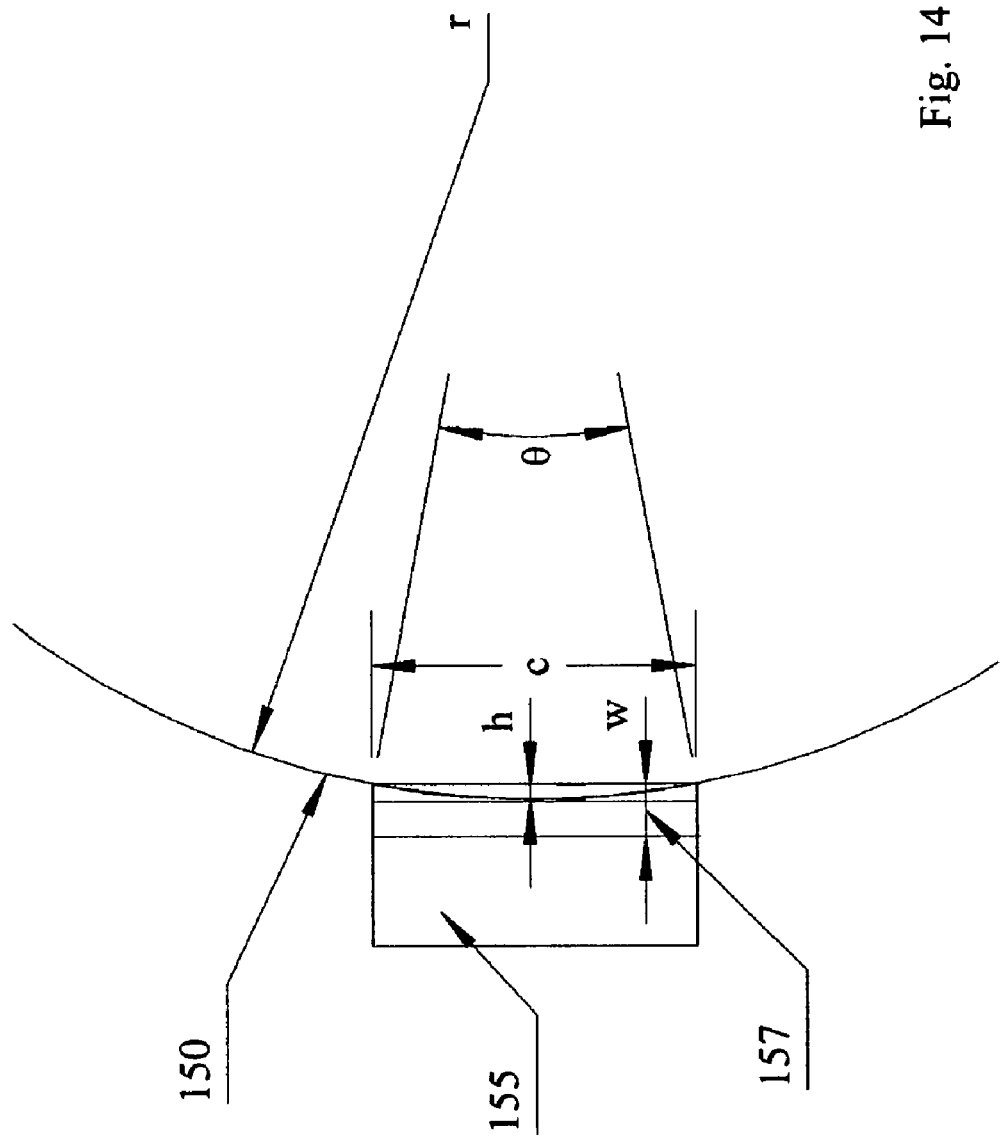

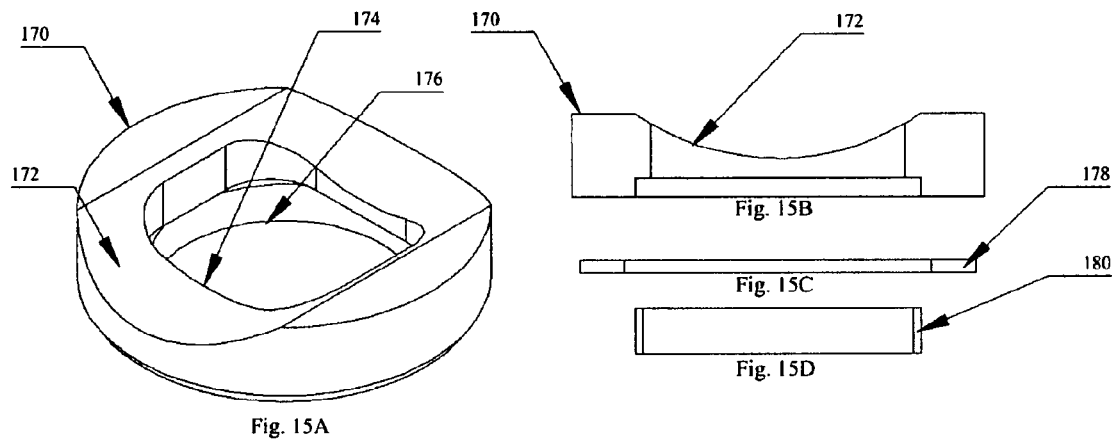
Fig. 15A
Fig. 15B
Fig. 15C
Fig. 15D
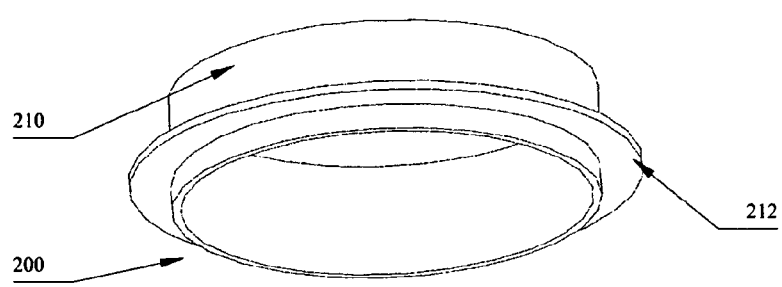
Fig. 16

ROTARY VALVES AND VALVE SEAL ASSEMBLIES

RELATED APPLICATIONS

This application is related to and claims the benefit of the priority date of provisional U.S. Patent Application Ser. No. 60/845,660, entitled "Rotary Valves and Valve Seal Assemblies", filed Sep. 19, 2006, by David A Slemp.

FIELD OF THE INVENTION

The invention herein relates generally to rotary valve assemblies and valve components including valve seal assemblies for use in internal combustion engines.

BACKGROUND OF THE INVENTION

In an internal combustion engine of the piston and cylinder type, nearly all designs in use in automotives today utilize "poppet" valves which intermittently open to allow intake of air and exhaust of waste gases, and close to permit the cylinders to carry out the compression and combustion cycles of the engine. A conventional poppet valve typically is spring loaded and works in conjunction with rocker arms, lifters and a camshaft the timing of which is linked ultimately to the engine crankshaft. Ideally the cycles of valve opening and closure taking place within this high pressure and high temperature environment are unimpeded by friction or parts failure, and closure is sufficiently secure to maximize compression, fuel burning and engine performance.

However, the operation of a conventional poppet valve depends upon the interaction of numerous small parts, is subjected to excessive wear, and suffers various inefficiencies. These inefficiencies include, for example, parasitic loss in the form of friction and reciprocating inertia, and pre-ignition due to high exhaust valve temperatures. These various inefficiencies often result in excessive emissions, excessive fuel consumption, and vibration and noise including, for example "engine knocking". In addition, the performance of each poppet valve and associated components also depend upon a significant volume of oil and the accompanying need for frequent oil change.

A significant source of parasitic loss in a poppet valve system is the inertial loss from reciprocating components. Moreover, as there are two or more poppet valves in use per cylinder, there are many valves total in operation for each automotive engine. The valve bodies, lifters, pushrods, and springs in operation for each valve all have a mass that is twice accelerated and decelerated every other crankshaft revolution. These loads are continually taking power from the engine, and increase exponentially with increase in engine speed.

Rotary valves offer several advantages over poppet valves. For example, at constant engine speed, a rotating cylindrical valve assembly bears no inertial load on an engine. Inertial loads with a rotary valve are born by the engine only during acceleration and deceleration and are typically extremely low. In addition, rotary valves improve the coefficient of gas flow as compared to similar sized poppet orifices and allow much larger peak valve areas than poppet valves, thereby improving high speed operation. The use of rotary valves such as those disclosed herein requires only one port in the roof of the combustion chamber to serve as both the intake and exhaust valve, thereby allowing the entire valve area to be dedicated to both intake and exhaust as required. Further, this port is unobstructed unlike with a poppet valve, the body of which obstructs a port to reduce flow in both intake and exhaust. Air flow is thereby significantly higher with the invention disclosed herein, enabling higher volumetric efficiency at high engine RPMs. Increased flow at higher RPMs increases an engine's peak power potential and therefore can enable the use of smaller more fuel efficient engines where a larger engine would otherwise be required. Engine speed moreover is not limited by a rotary valve as they are by a poppet valve. And finally, rotary valves have a much larger thermal mass and heat transfer area than a poppet valve or valves, thereby significantly reducing in-cylinder peak component temperatures to greatly lower the likelihood of pre-ignition (knocking). A lower valve temperature also allows greater compression ratios to significantly improve engine thermal efficiency.

With a world oil market price surpassing seventy dollars a barrel and predictions of ever increasing global demand and price, the high cost of dependence upon foreign sources of oil, and dire warnings from climatologists about the impending irreversible global change resulting from greenhouse gases, there is a need for innovation of the internal combustion engine to reduce its consumption of oil and its emissions, and to improve its overall efficiency. Increased fuel efficiency and reduced oil consumption and emissions and smoother operation are among the potential advantages of a rotary valve.

Numerous rotary valve designs have been proposed to replace the more conventional poppet valve. However, various drawbacks of previous designs have rendered such designs thus far incapable of achieving these objectives. For example, the continued need for lubricating oil for operation of the rotating valve assembly, and the consequential increased emissions from the burning of oil as the oiled valve assembly surface rotates into the combustion chamber are characteristic drawbacks. Achieving adequate combustion chamber sealing is a continuing challenge of a successful rotary valve system, especially under the substantial pressures and thermal stresses of an internal combustion engine and the rotational forces of a rotary valve. These challenges have led to a need in the art for a rotary valve assembly that does not suffer these drawbacks. Further, there is a need in the art for a valve designed to vary the valve parameters of timing, duration, and valve area, based upon the instantaneous demands on the engine.

SUMMARY OF THE INVENTION

A seal assembly for use with a rotary valve for an internal combustion engine is disclosed comprising at least one combustion chamber, a seal body and a seal ring. The said seal ring is configured to couple the seal body to a combustion chamber and the seal ring comprises a principle region and one or more reinforcement regions. The seal body may comprise naturally lubricious graphite comprising a hardness of at least 60 Rockwell C. The seal ring may comprise one or more metals, which is malleable, heat tolerant and thermally conductive, and may comprise annealed copper.

The seal assembly may be used with a rotary valve which comprises an axis of rotation when in operation, where the rotation confers substantial lateral force upon the seal assembly. A reinforcement region may substantially secure the seal assembly against the lateral force. The seal ring may expand thermally for sealing engagement of the seal assembly to the combustion chamber. A seal ring according to the invention may comprise one or more materials which aid in dissipation of heat, and may be configured to aid in the dissipation of heat. A rotary valve may comprise an outer surface in dry sliding engagement with the seal body. The seal body may comprise graphite comprising compressibility of at least 35,000 psi and heat tolerance to at least 350° C.

A seal assembly according to the invention may comprise an anchor securing the seal assembly in a second direction, substantially opposite a first direction of lateral force resulting from rotation of the valve assembly. The anchor may comprise a yoke substantially surrounding the seal assembly and affixed to the engine head. The anchor may comprise at least one pivot point.

A valve assembly according to the invention may comprise a rotor disposed within a casing, a gap between the rotor and the casing, and a compressible material disposed within the gap. The compressible material may comprise graphite, and may substantially prevent the travel of gases through said gap. It may also be significantly thermally conductive, and may comprise one or more reinforcement materials. The compressible material may be at least 30% compressible, and may be configured in a plurality of sheets. The sheets may be compressed or uncompressed, and may be disposed along the axis of the rotor. Further, the dimensions of the sheets may be selected according to the formula $c=2\sqrt{h(2r-h)}$ and $\theta = 2\alpha \sin(c/2r)$ and $360/\theta$ =Number of segments.

The gap and the compressible material may permit thermal expansion of the rotor. The compressible material may be sufficiently naturally lubricious to permit dry sliding engagement of the rotor with the compressible material. The seal assembly may comprise sufficient natural lubricity to permit dry sliding engagement with the outer surface of the rotor.

A rotary valve assembly according to the invention may include a combustion chamber having a combustion chamber port of a first geometry, a rotor having a rotor port of a second geometry for at least partial intermittent mating with the combustion chamber port to define a valve comprising a maximum valve area and a maximum valve duration. An assembly according to the invention may also comprise means for adjusting the assembly in order to vary the maximum valve area and the maximum valve duration, where the first and second geometries are selected to achieve a desired curve of the relationship between the maximum valve area and the maximum valve duration during operation of the valve. The first and second geometries may be selected in order to optimize volumetric efficiency, where the volumetric efficiency is optimized dynamically via the means for adjusting the assembly. The means for adjusting the assembly may permit selective reversible adjustments of an engine between an Atkinson cycle and an Otto cycle.

A seal assembly according to the invention may comprise a top orifice having a first area and a bottom orifice having a second area, wherein the first area is less than the second area. The first area may be sufficiently less than the second area to create a pressure differential during the compression cycle of the engine.

BRIEF DESCRIPTION OF THE DRAWINGS

FIGS. 2A-2D are schematic illustrations of the successive periodic overlap of fixed and moving ports as a result of valve rotation in an embodiment according to the invention.

FIG. 3A illustrates a cross-sectional side view of an alternative rotary valve assembly according to the invention showing the rotor in a first axial position relative to the bank of cylinders.

FIG. 3B illustrates the embodiment of FIG. 3A following adjustment of the rotor to a second axial position relative to the bank of cylinders.

FIGS. 4A-4C are schematic illustrations of the successive overlap of fixed and movable ports when the rotor is in a first axial position in an embodiment according to the invention.

FIG. 5A-5C are schematic illustrations of the successive overlap of ports when the rotor of FIGS. 4A-4C is adjusted to a second axial position.

FIG. 6 is a graph comparing the curve of progressive valve area versus valve duration when the rotor is in a first axial position to the curve of progressive valve area versus valve duration after the rotor is adjusted to a second axial position.

FIG. 14 is a schematic illustration of the relationship between the radius of a rotor and the desired width of a sheet of graphite foil according to the invention.

FIG. 15A is top perspective view of a component of a seal assembly according to the invention.

FIG. 15B is a side view of the embodiment of FIG. 15A.

FIG. 15C is a side view of a component of a seal assembly according to the invention.

FIG. 15D is a side view of a component of a seal assembly according to the invention.

FIG. 16 is a perspective view of a component of a seal assembly according to the invention.

DETAILED DESCRIPTION OF THE INVENTION

Figure 1:
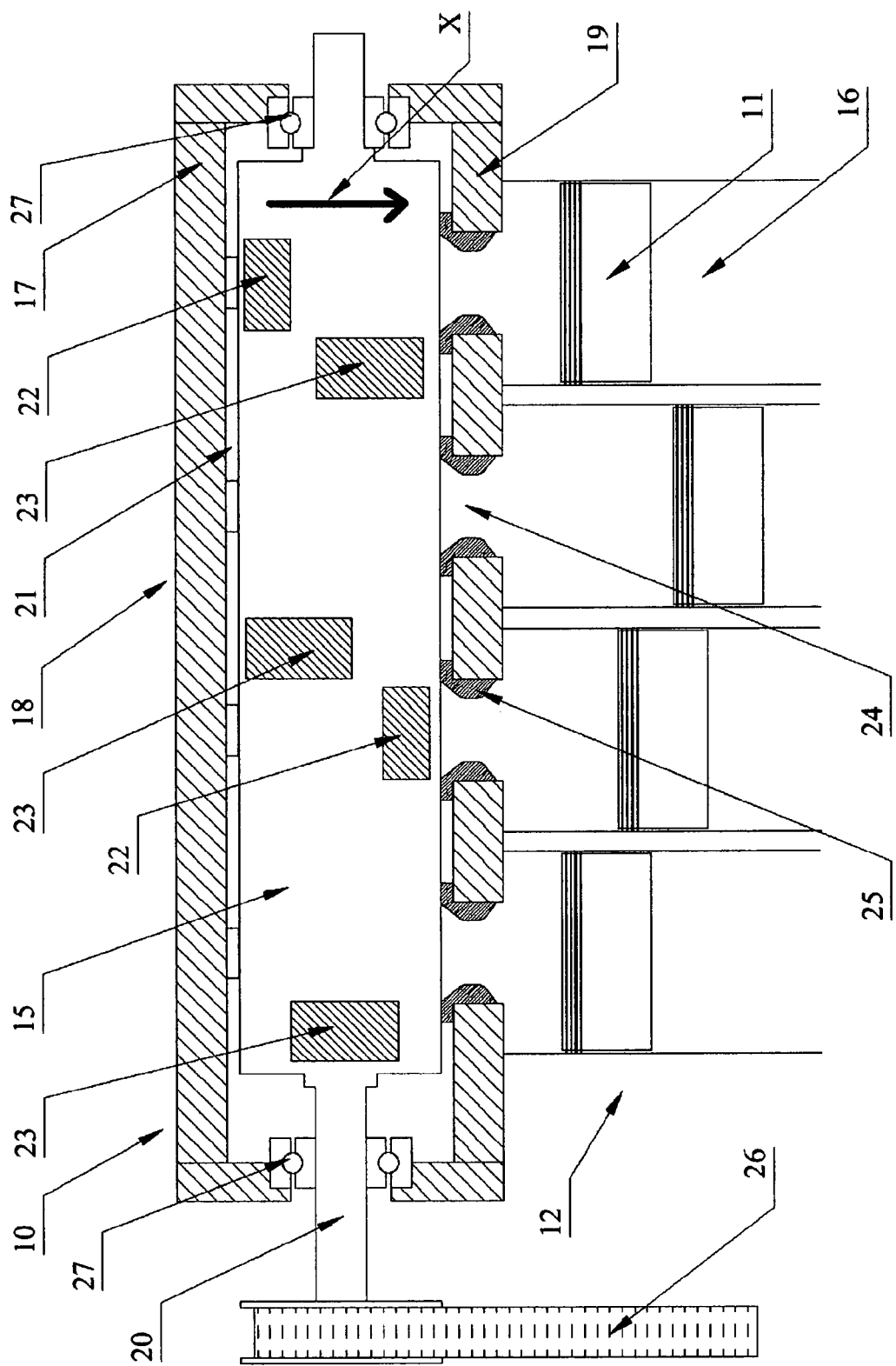
FIG. 1 is a cross-sectional side view of a valve assembly according to the invention mounted upon a bank of four cylinders.

A "rotor" as used herein is understood to mean a generally hollow cylindrical body which, in operation, is rotating. A rotor may have one or more separate interior compartments.

The term "port" is used herein to refer to a single opening, whether fixed or movable. The temporal mating of two separate ports, either partial or total, serves to form a valve. A "rotor port" is understood to mean an orifice in the rotor, and consequently is a movable port. A "seal port" is used herein to refer to a stationary port of a combustion chamber which is generally circumscribed by a seal assembly. A portion of the outer surface of the seal body interfaces with the outer surface of the rotor.

An "intake head port" and an "exhaust head port" are also fixed ports of a cylinder head to permit fluid communication between the rotor ports and the intake manifold or exhaust manifold respectively. One or more of the rotor ports is referred to herein as a "rotor intake manifold port", and is positioned about the rotor such that it will periodically mate with a fixed "intake head port", to define an "intake manifold valve". Similarly, the rotor disclosed herein has at least one "rotor exhaust manifold port" that, in temporal association with an "exhaust head port" serves the "exhaust manifold valve".

A "rotor intake combustion chamber port" is a port which is disposed about the rotor such that it, in periodic conjunction with a seal port, defines an "intake combustion chamber valve". Such a valve is in periodic communication with the intake chamber within the rotor, which connects the intake manifold port to the combustion port. When the rotor intake manifold port is aligned with the intake head port, and the rotor intake combustion chamber port is aligned with the seal port, the intake valves are open and a flow path therethrough into the combustion chamber is defined.

The "rotor exhaust combustion chamber port" is disposed about the rotor such that it, in periodic conjunction with a stationary seal port, periodically defines an "exhaust combustion chamber valve". When the exhaust combustion chamber valve is open, and the exhaust manifold valve is open, the exhaust combustion chamber within the rotor provides a path to the exhaust manifold, thereby allowing waste products of the combustion cycle to escape from the engine. None of the above mentioned ports are in alignment during the compression phase, allowing compression of gas to occur upon action of a piston, prior to combustion.

A "cylinder bank" is a series of engine cylinders; each cylinder can communicate simultaneously to a single rotor, where that rotor has intake and exhaust ports for each cylinder.

"Valve area" is understood to mean the area of the opening of any valve, and is determined by the overlap area of two ports when they mate, allowing gas flow through that area.

"Peak valve area" is the largest possible overlap area resulting when two ports mate.

"Maximum peak valve area" is achieved when two ports are in alignment such that the largest area of overlap is possible when the two ports mate.

"Minimum peak valve area" is achieved when, as a result of axial adjustment of a rotor with respect to a cylinder bank, the smallest effective amount of overlap of two ports results.

"Valve duration", sometimes referred to simply as "duration" is expressed in degrees, and is the sum of the number of degrees of the fixed port and the number of degrees of the rotor port that overlap to define the valve. It may be expressed with the equation: $\theta_{dur}=\theta_p+\theta_s$, where $\theta_{dur}$ is valve duration, $\theta_p$ is the rotor port size and $\theta_s$ is the seal port size, all values expressed in degrees of rotor rotation.

"Otto cycle" refers to the well-known four cycle internal combustion engine cycle including intake, compression, combustion and exhaust.

"Atkinson cycle" refers to a modification of the more common Otto cycle in which the intake valve is held open longer than normal to allow a reverse flow of intake air into the intake manifold thereby reducing the effective compression ratio and, when combined with an increased stroke and/or reduced combustion chamber volume, allows the expansion ratio to exceed the compression ratio while retaining normal compression pressure. The objective of the Atkinson cycle is improved fuel economy because the compression ratio in a spark ignition engine is limited by the octane rating of the fuel used. A high expansion ratio delivers a longer power stroke, allowing more expansion of the combustion gases and reducing the amount of heat wasted in the exhaust, resulting in a more efficient engine.

A "pivot point" is a point disposed at any location about a valve assembly according to the invention about which at least some rotational movement is permitted.

A "reinforcement agent" may be any substance added, mixed, infused, injected, applied to or otherwise combined with another material to increase the mechanical and/or structural strength of the material. Examples of reinforcement agents include, but are not limited to, stainless steel and carbon fiber.

FIG. 1 shows a cross-sectional side view of a valve assembly according to the invention. In this example, the valve assembly is designed for use singly with a four cylinder engine; two of the assemblies may be used with each four-cylinder bank of an eight cylinder engine. A valve assembly according to the invention may alternatively be designed for use with any other number of cylinders. Valve assembly 10 is shown mounted on engine block 12. Valve assembly 10 comprises rotor 15, head casing 18, rotor combustion chamber ports 22, rotor manifold ports 23, valve seal ports 24, seal assemblies 25, timing belt 26, and bearings 27. Rotor 15 may be, for example, a single, substantially hollow cylindrical steel rotor with internal chamber walls (not visible) and central shaft 20 for mounting rotor 15 within head casing 18 via the ends of central shaft 20. Assembly 10 and head casing 18 may comprise an upper casing 17 and lower casing 19 in a clamshell arrangement. Aluminum is an example of suitable material for use in the fabrication of head casing 18, but other suitable material may be used. Pistons 11 are shown in various stages of operation within cylinders 16, which may together define, for example, 60 cc or other suitable volume combustion chambers. Lower head casing 19 may have minimum required coolant passages therethrough (not pictured).

Valve rotor 15, when in operation, rotates according to timing belt 26, which is linked to the engine's crank shaft (not shown) by a series of belts, gears, and/or chains (not pictured) or other suitable mechanism. While rotating, and as discussed in more detail below, rotor ports 22 communicate periodically with seal ports 24 according to the selective distribution of rotor ports 22 about valve rotor 15, in order to successively open and close the engine valves. Similarly, and as described more fully below, rotor manifold ports 23 communicate periodically with the head ports (not pictured), in order to open and close the engine valves as required in order to carry out the cycles of the internal combustion engine.

Rotor ports 22 and rotor manifold ports 23 are selectively disposed about rotor 15 depending upon direction of rotation of rotor, which in this example has advantageously been selected to achieve optimal spin balance by rotating in the direction of arrow X, away from intake, across the combustion chamber, and toward the exhaust (not pictured). Positions of the ports are also selected to achieve desired port separation, desired intake and exhaust manifold angular offsets from the combustion chamber center line, and the desired area of the intake or exhaust combustion chamber valves. In engines which are being converted from the conventional poppet valve/camshaft design, the desired separation of the rotor ports is directly related to the separation of the lobes of the camshaft. The desired angular offset of the rotor and combustion chamber ports is directly related to the fixed angular offsets of the intake and exhaust seal ports.

To eliminate the valve's contribution to oil consumption and the associated emissions problems that have hampered past rotary valve designs, there will be no oil used for lubrication of rotor 15 in head casing 18. Rotor 15 is free floating within head casing 18 with gap 21 between the interior surface of casing 18 and the outer surface of rotor 15. The size of gap 21 will generally be in the range of 0.040-0.050 inch, but may be smaller or greater. Gap will allow rotor 15 to expand and contract as necessary under the heat load of combustion and exhaust gases. As described more fully below, valve assembly 10 may include a compressible graphite foil (not pictured) disposed within gap 21, surrounding rotor 15.

FIGS. 2A-2D illustrate the successive periodic mating of rotor ports and combustion chamber or head ports, during which a respective valve is open, and the periods during which there is no overlap of the ports, at which point all valves are closed. For example, in FIG. 2A, all valves are closed, during which time the combustion cycle may take place. FIG. 2B reflects rotation of the rotor in the direction of arrow Y to the point where exhaust combustion chamber port 32 overlaps seal port 34 to define and thereby open exhaust combustion chamber valve 35. In addition, at this position of the rotor, exhaust manifold port 36 overlaps exhaust head port 37 to define and open exhaust manifold valve 38, defining a flow path through exhaust chamber valve 35 and exhaust manifold valve 38, thereby allowing by-products of combustion to escape from the combustion chamber and out of the engine.

FIG. 2C represents the respective position of ports following further rotation of the rotor in the direction of arrow Y, at which point intake combustion chamber port 42 overlaps seal port 34, thereby defining and opening the intake valve 44. Further, intake manifold port 46 has been brought to overlap intake head port 48. Air is thereby allowed into intake manifold 46, through intake valve 49 and into the combustion chamber (not pictured). Next, the rotor is further rotated to arrive at the position illustrated in FIG. 2D, in which no ports overlap, and consequently all valves are closed, during which time the compression cycle may occur. Following compression and combustion the cycle may repeat.

FIGS. 3A and 3B illustrate an embodiment according to the invention in which the position of rotor 60 can be adjusted within head casing 61 along longitudinal axis L with respect to cylinder bank 64. In FIG. 3A, rotor 60 is illustrated in a first position. When in this first position, rotor port 66, upon rotation of rotor 60, does not align completely with seal port 68. Rather, rotor port 66 is somewhat offset from seal port 68. Valve 70a, which is thereby defined, comprises a minimum peak valve area.

In contrast, as shown in FIG. 3B, after rotor 60 has been adjusted by way of linear actuator 74 to a second position, rotor port 66 completely overlaps seal port 68. Linear actuator 74 is illustrated as a lever 72 and spring mechanism 76, but may alternatively be of any suitable design for simple manual or automated linear control of the position of valve rotor 60 with respect to cylinder bank 64. The resulting valve 70b comprises a maximum peak valve area. Rotor 60 is continually and reversibly adjustable along longitudinal axis L between a first position represented in FIG. 3A and a second position represented in FIG. 3B, as well as positions intermediate the first and second positions (not pictured.) Rotor 60 can thereby be adjusted by the operator depending upon the instantaneous demands placed upon the engine in which valve assembly 61 is utilized. For situations in which higher flow is required by the engine at higher RPM, the operator can adjust rotor 60 to the second position illustrated in FIG. 3B.

The axial shift described above allows instantaneous dynamic adjustment of valve area and valve duration based the needs of the engine. In addition, variable valve area enables the operator to dynamically optimize volumetric efficiency of the engine. The axial shift described allows for change in cycle type, for example, from the four stroke Otto cycle to the four stroke Atkinson cycle. The Atkinson cycle is typically used unchangeably in modern fuel efficient engines. This design allows for temporary use of Atkinson cycle and conversion, when needed to Otto cycle for full performance requirements.

FIGS. 4A-5C is a schematic illustration of overlap of rotor port 80 and seal port 84 at three successive points during the rotation of a rotor (not pictured). Rotor port 80 is of a generally "T" shape, but may be of an alternative desired configuration FIGS. 4A-4C represent three successive points of overlap that constitute minimum peak valve area and duration. FIGS. 4A-4C represent the amount of overlap resulting when a rotor (not pictured) is in a first position along its linear axis with respect to a cylinder bank (not pictured). In contrast, FIGS. 5A-5C illustrate three successive points of overlap of ports defining a maximum peak valve area and duration. The amount of overlap shown in FIGS. 5A-5C are the result of adjustment of a rotor (not pictured) along its linear axis with respect to a cylinder bank (not pictured) to a second position, similar to the axial shift described above in relation to FIGS. 3A-3B.

FIG. 6 is a graphic comparison of the function of the valve when the rotor is in the first axial position as reflected schematically in FIGS. 4A-4C above, to the function of the valve after the rotor is moved to the second axial position represented in FIGS. 5A-5C above. Curve N depicts the performance when the rotor is in a first axial position, permitting maximum valve area versus duration at points $N_1$, $N_2$ and $N_3$, peaking at the midpoint $N_2$. Curve O depicts the function of the valve when the rotor is shifted to a second axial position, at which the minimum valve values are reflected at points $O_1$, $O_2$ and $O_3$. Additional comparisons of minimum and maximum peak valve areas and duration are discussed below in relation to FIGS. 8A-13C.

Figure 7:
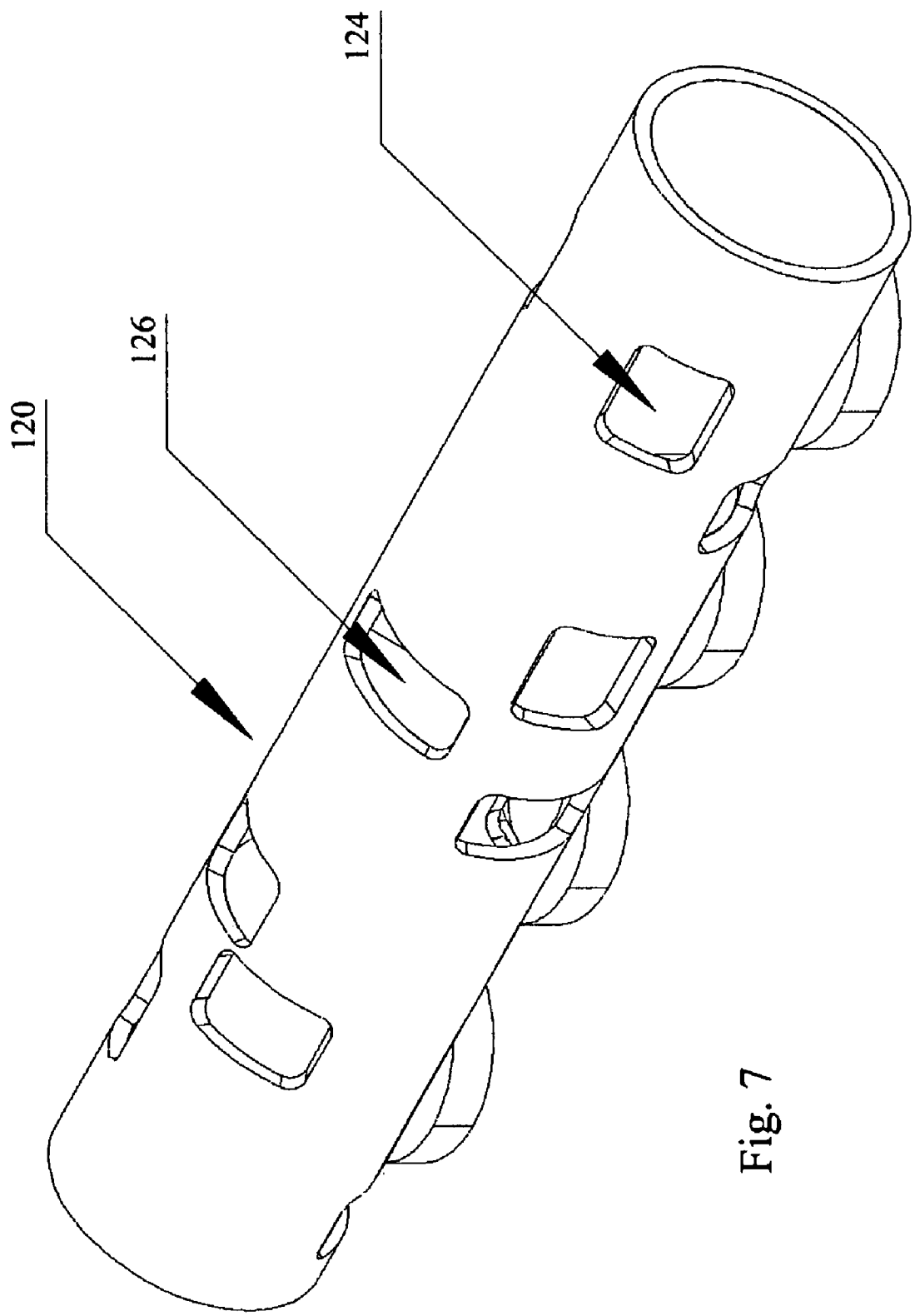
FIG. 7 is a perspective view of an embodiment according to the invention.

FIG. 7 is a perspective view of a rotor 120 used with an assembly according to the invention Rotor 120 is hollow cylinder constructed of hard chrome plated steel and may have one or more internal chambers (not pictured). Other materials compatible with the high temperature environment and performance within an internal combustion engine may be suitable. Rotor 120 has a much higher thermal mass and thermal transfer area than a poppet valve, which ensures that, in operation, it will maintain a much lower operating temperature than a poppet valve, thereby reducing the likelihood of pre-ignition. Such an advantage allows for engine operation at increased compression ratios for higher fuel conversion efficiency. Unlike poppet valve designs, this rotary valve design allows the increase in compression ratio without the need for increasing the fuel's octane rating.

The outer surface of rotor 120 is ground to a fine finish for high tolerance, low wear and low friction, and will interface with the graphite surface of a seal body (described below). Rotor 120 may, for example, slide on a keyed power shaft to allow axial shift as described above in relation to FIGS. 2A-6 above.

Rotor combustion chamber ports 124 are shown in generally rectangular shapes, but any other desired shapes may be utilized in order to control valve opening and closing profile. (See FIGS. 8A-13C and related discussion below.) As compared to the associated combustion chamber port, manifold ports 126 are cut with greater angular size and narrower axial length to match peak port area while ensuring manifold ports are always more opened than the associated combustion chamber port. The effect of the manifold ports greater duration allows pressure to be equalized between the rotor chamber and associated manifold port before and after the combustion chamber valve actuates. This allows the combustion chamber port to be the controlling valve in the valve system.

Figure 8A:
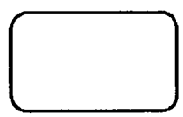
FIG. 8A-13C illustrate examples of port geometry combinations and a comparison of each combination's area and duration.
Figure 8B:
Figure 8C:
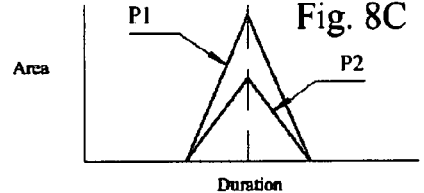

FIGS. 8A-8C illustrate several examples of port geometry combinations and resulting valve performance, comparing a maximum valve area progression to peak valve area and duration back to closure, and minimum valve area progression to its peak and duration. FIG. 8A represents a generally rectangular rotor port combined with a relatively rectangular seal port of FIG. 8B. FIG. 8C illustrates that maximum overlap of these two ports results when the rotor is in a first axial position and is reflected in a steep, straight line progression to the maximum valve area at the midpoint of the curve with a mirrored decline until valve closure (curve $P_1$). Following axial adjustment of the rotor to a position in which the smallest valve opening results, valve function from closed to open and back to closed is reflected in curve $P_2$. When comparing $P_1$ and $P_2$, it can be concluded that while the peak valve area will change after the rotor is shifted to a second position, the valve duration does not change.

Figure 9A:
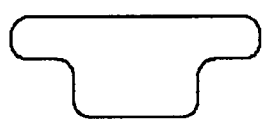
Figure 9B:
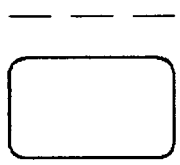
Figure 9C:
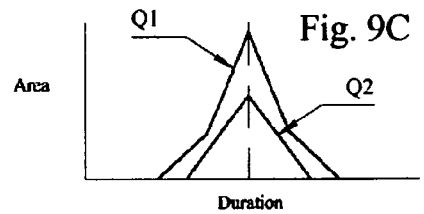

FIG. 9A reflects an alternative rotor port geometry which can be employed in conjunction with the generally rectangular port of FIG. 9B. Curves $Q_1$ and $Q_2$ illustrate the comparative area and duration of the valve resulting from the alternative rotor port geometry, comparing the valve function when the rotor is at a first axial position to the valve function after the rotor has been adjusted to a second axial position. Both peak valve area and valve duration change as a result of an axial shift and the respective port geometries. FIG. 9C further illustrates a stepped duration increase on either side of the base in $Q_2$, but the slope of the area is smaller due to the narrower width of the top part of the 'T'.

Figure 10A:
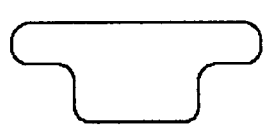
Figure 10B:
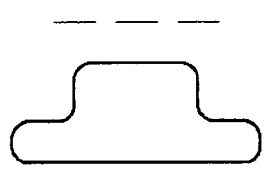
Figure 10C:
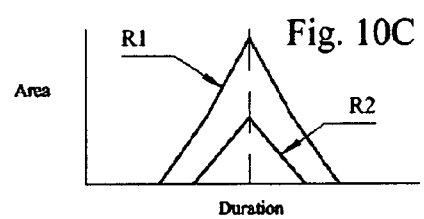

Similarly, FIGS. 10A-10C illustrate additional examples of port geometry combinations and resulting valve function $R_1$ illustrates a ports geometry combination that serves to even out the slope of the curve. This presents a larger area to be opened as the variable valve is opened up towards the peak valve area. The duration change is not linear in this example, but is a step function from one profile to the other.

Figure 11A:
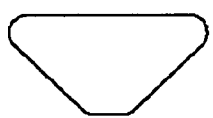
Figure 11B:
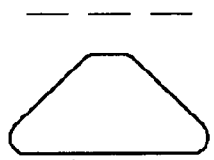
Figure 11C:
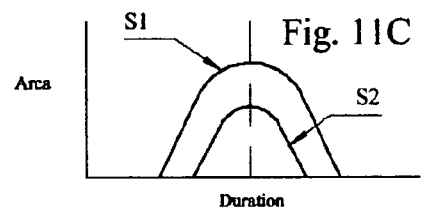

FIGS. 11A-11B illustrate two opposed generally triangular ports. (The term "triangular" is used loosely here, and it will be understood that the term "generally triangular" is not limited to a shape that is technically a triangle.) Utilizing these port geometries together perform to "round" the curve approaching the peak valve area in both first and second axial positions of the rotor, as illustrated in FIG. 11C. An example of an important benefit of this combination is to provide a means of linear duration change via axial adjustment. In other words, valve duration increases evenly as valve area increases.

Figure 12A:
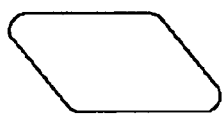
Figure 12B:
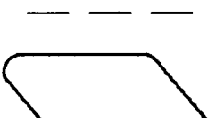
Figure 12C:
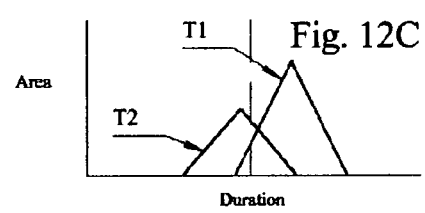

FIGS. 12A-12C illustrate a means to provide a linear area change while keeping the duration constant. In addition, and advantageously, this design allows the actual timing of the valve operation to be advanced or retarded, depending on the shape and direction of the trapezoids of FIGS. 12A and 12B. This timing change is linear over the range of axial adjustment of the rotor.

Figure 13A:
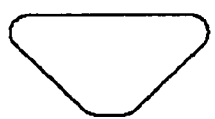
Figure 13B:
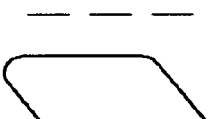
Figure 13C:
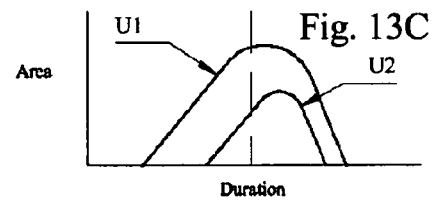

FIGS. 13A-13C illustrate an example of a combination of generally triangular and trapezoidal port geometries. This combination has several unique features. Assuming the angles on the triangles and trapezoids are 45 degrees, the area slope on one side is 2× that of the other, offering an asymmetric profile. The triangular port also offers a rounded top on the profile, and the trapezoid will shift both the duration as well as the timing center, making the duration changes asymmetric on either side of the profile. It also has the advantage of linear duration and timing changes through the range of adjustment of port overlap.

The foregoing examples of port geometry combinations are not intended to enumerate all possible combinations. According to the invention, the shape of ports can be selected to confer desired valve profiles that impact valve area, valve duration, slope, and timing.

As mentioned above in relation to FIG. 1, there will be no oil used for lubrication of rotor 15 or alternative rotor according to the invention in the cylinder head; the rotor is free floating within the head casing with a relatively small gap between the outer surface of the rotor and the interior surface of the head casing. The gap will allow the rotor to expand and contract as necessary under the heat load of combustion and exhaust gases. In order to assist in the removal of heat from the rotor to the head casing, the gap will be filled with a compressible flexible graphite foil sheet. This foil may typically be 0.060 inch thick, but may also be of greater or lesser thickness, and can be compressed 40% or more. Such compressibility allows for variation in radius of rotor due to thermal expansion.

Additionally, a thin perforated stainless steel sheet may be impregnated into the graphite foil for strength and flexibility. This foil will act as a gasket to help seal against low pressure exhaust and intake gases that otherwise may leak into the gap, or otherwise stated, it will fill most of the gap volume and therefore not provide much excess volume for the leaked gases to occupy.

The graphite foil is desirably capable of withstanding high engine temperatures. Further, it should provide a dry lubricated surface contact because it is naturally lubricious and has a low coefficient of friction and consequently a relatively low resistance heat transfer path to wick heat away from the rotor to the casing during operation. The foil provides sealing for stationary ports when communicating with the rotor ports; provides uniform sealing when the rotor is axially translated for variable valve area operation. The compressed foil may include intentional small leak paths, routed to the intake because of its vacuum; anything not burned will go back through and burn completely, thereby enhancing fuel efficiency and maintaining the emissions integrity of the engine.

Graphite foil is made by compressing naturally occurring flake graphite under high temperature and pressure to achieve its unique properties. The foil is highly compressible, but excessive bending which may be required to form the foil around the relatively small radius of the rotor may stress the flake to flake bond of the foil. Consequently, it may be best to apply the graphite in flat strips with the long dimension of each strip along the length of the rotor. The width of the strips is determined such that the compression stresses will be concentrated in the center of the strips, where the foil is the strongest, and the edges of the strips will be subjected to minimum or no compressive stress, avoiding excessive wear from rotating frictional force. The foil thereby remains relatively flat during manufacture. An additional advantage is that a thicker foil may be used for greater compression deflection without weakening or damaging the foil.

In order to determine the desired width of the strip, the following calculation is made, and is better understood when described with reference to FIG. 14 In FIG. 14, rotor surface 150 having radius r, metal substrate bar 155, graphite foil 157 are illustrated. The desired foil width w is related to the cord length c of the line segment perpendicular to the radius minus the compressive depth h. The angular coverage θ of a single chord length in degrees may be then determined, and then the number of equal segments, in degrees. For example, assuming that a 0.2 cm thick foil can be compressed 50% against a 4 cm radius rotor, and maximum compression is desired in the center of the strip, with zero compression at its edge (while remaining in contact with the rotor), the following calculation can be made:

r=4 h=0.1

$c=2\sqrt{h(2r-h)}$ c=1.778

θ=2α sin(c/2r)

θ=25.667

360/25.667=14.026

Therefore, 14 segments are required.

FIGS. 15A-15D are perspective and side views respectively of components of a seal assembly according to the invention. FIG. 15A is a perspective view of seal body 170, which in general, comprises a hard graphite naturally lubricious material. Seal body 170 may be constructed from bearing grade antimony doped graphite, silicon carbide, or other low wear, hard, suitable material. An example of suitable antimony-doped hard graphite material is sold under the name Graphtek GR-3205. Hardness of the material is approximately 72 Rockwell C. Compressibility is very high at 37,500 psi and is designed to operate up to 400° C. This material is self-lubricating. Additional examples of suitable materials include, but are not limited to, boron nitride composites, silicon carbide. Other materials may be suitable and within the scope of the invention.

In operation, top surface 172 of seal body 170, bears against the rotor (not pictured). Because of the graphite materials' natural lubricity, the rotor is able to rotate while in contact with top surface 172. The configuration of top surface 172 is shown in profile in FIG. 15B. Top surface 172 comprises top orifice 174, which may be rectangular or any other shape suitable for achieving a desired valve opening profile. Bottom orifice 176, mated with the cylinder bank, may be cylindrical and may be slightly larger in area than top orifice 174. When in operation, the area bias between top orifice 174 and bottom orifice 176 creates a small force to be applied on seal body 170 to the rotor (not pictured) when under combustion pressures, thereby aiding in tight sealing.

Seal body 170 is coupled to the cylindrical combustion chamber via a seal ring, such as seal ring 180 shown in FIG. 15D. A wave spring such as wave spring 178 with shim washers (not pictured) is used to select and apply a constant amount of force on the seal body 170 to press against the rotor to ensure seal integrity throughout all phases of the internal combustion engine. Seal ring 180 may be made of plated annealed copper or other suitable malleable high temperature metal. The combustion chamber pressure and heat forces seal ring 180 to expand and seal the combustion chamber interface (not pictured) to seal body 170. The dimensions of seal ring 180 may advantageously to provide an interference fit to the seal body and the head casing and consequently require dry ice cooling prior to assembly.

FIG. 16 is a perspective view of an alternative embodiment of a seal ring according to the invention. Seal ring 200 may be used in conjunction with a seal body according to the invention, and comprises relatively thin wall 210, and reinforcement disc 212. Seal ring 200 has a relatively flat outer reinforcement disk 212 to ensure that seal ring is kept flat and in position. The flat outer ring feature additionally aids in heat transfer to the outer casing, thus lowering the combustion chamber temperature and minimizing pre-ignition Reinforcement disc 212 also improves seal ring 200's ability to withstand the significant tangential force of the rotor on the radius of disc 212. In operation, combustion chamber pressure and heat forces reinforcement disc 212 to expand and seal the combustion chamber interface to the seal body via seal ring wall 210. Seal ring 200 may alternatively flare at the top and bottom.

Figure 17A:
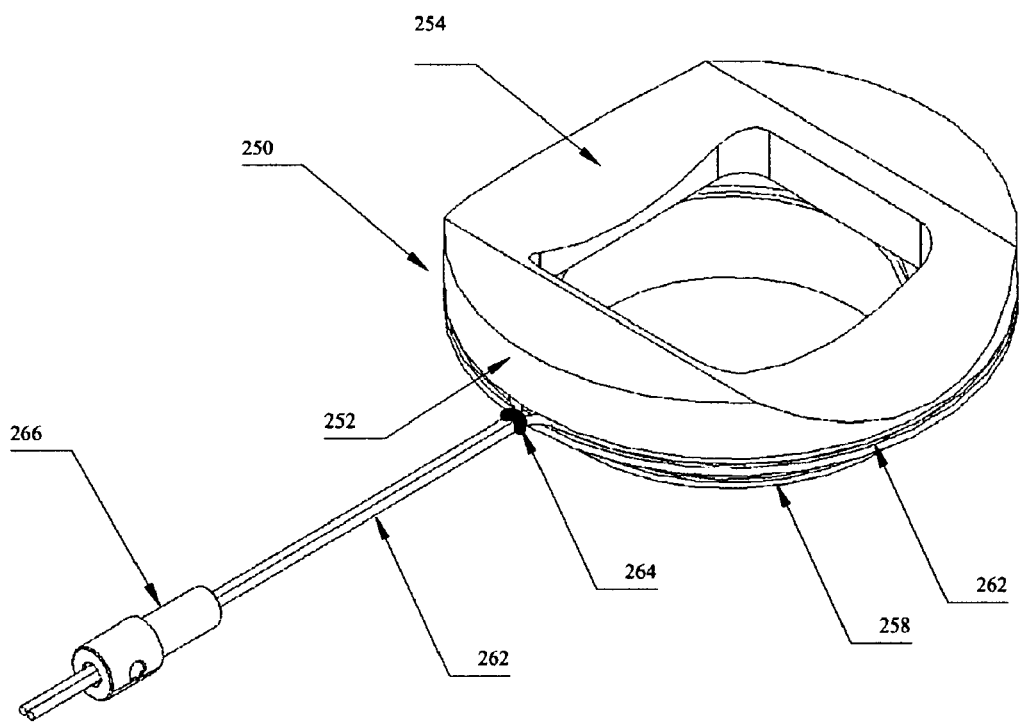
FIG. 17A is a perspective view of a seal assembly according to the invention.
Figure 17B:
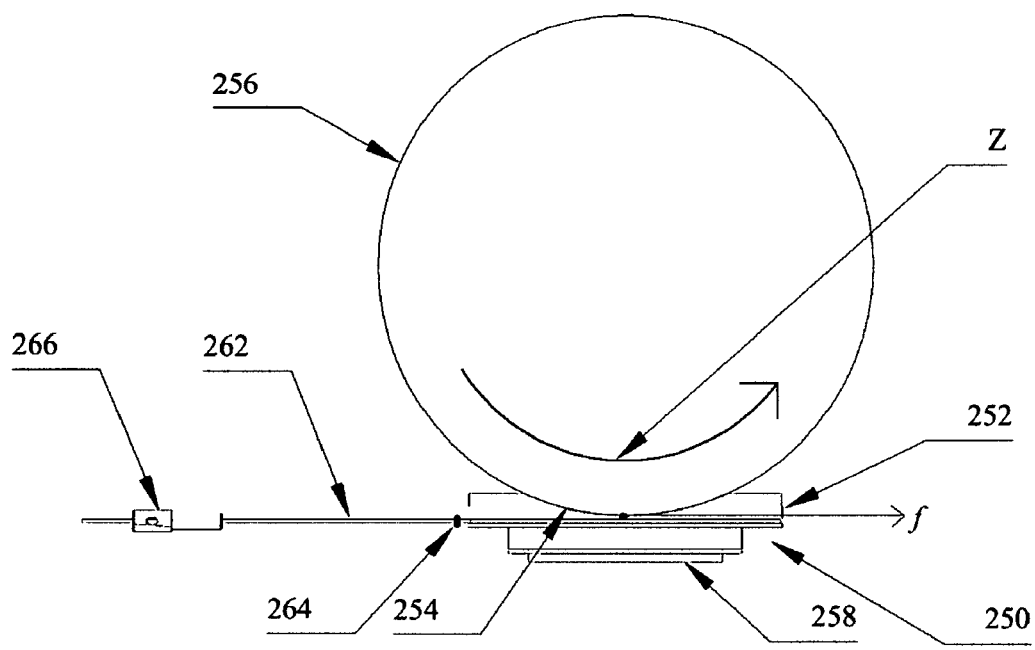
FIG. 17B is a side view of the embodiment in FIG. 17A.

FIG. 17A is a perspective view of an alternative seal assembly according to the invention. FIG. 17B is the side view of 17A with the rotor interface illustrated. Seal assembly 250 comprises seal body 252 which has top surface 254 and is coupled with a suitable seal ring (not visible). Top surface 254 bears against the outer surface of Rotor 256 in this example rotates in the direction of arrow Z, thereby creating rotational force f. Bottom cylinder 258 is configured to be coupled with the top of a combustion chamber (not pictured). In order to secure seal assembly 250 against rotational force f seal assembly also has groove 260 and collar 262 disposed therein. Collar 262 may be fabricated from steel cable or other suitable heat tolerant flexible material. Collar 262 has tightening element 264, and extends through the engine head casing (not pictured) away from seal body 252, opposite the direction of rotational force f Collar 262 is secured to the engine head (not pictured) via anchor 266. Tightening element 264 and anchor 266 are proximal to and generally represent pivot points of collar 262, and afford some desired flexibility to seal assembly 250 while also providing security to seal assembly 250 against rotational force f.

The inventions disclosed herein are suitable for use with any internal combustion engine comprising any number of pistons and cylinders. In order to further the understanding of the inventions herein, the following examples include valves designed for use with either a four cylinder or an eight cylinder engine. The inventions herein however should not be construed as limited to the following examples. Further, while particular forms of the invention have been illustrated and described above, the foregoing descriptions are intended as examples, and to one skilled in the art it will be apparent that various modifications can be made without departing from the spirit and scope of the invention.

I claim:

1. A seal assembly for use with a rotary valve for an internal combustion engine comprising at least one combustion chamber, said seal assembly comprising a seal body and a seal ring, wherein said seal ring is configured to couple said seal body to a combustion chamber in locking engagement, wherein said seal ring comprises a principle region and one or more reinforcement regions, and wherein said one or more reinforcement regions is configured at least to add structural support for said locking engagement and to dissipate heat.

2. The seal assembly according to claim 1 wherein said seal body comprises naturally lubricious graphite comprising a hardness of at least 60 Rockwell C.

3. The seal assembly according to claim 2 wherein said rotary valve comprises an outer surface in dry sliding engagement with said seal body.

4. The seal assembly according to claim 1 wherein said seal ring comprises one or more metals.

5. The seal assembly according to claim 4 wherein gases are received into and waste gases are generated within said combustion chamber, said seal body comprises an interior wall and an exterior wall defining a channel therebetween and an orifice therethrough, and wherein said assembly further comprises a spring configured to be received within said channel, and wherein said seal ring is configured to be received within said orifice, thereby excluding said spring from said orifice and substantially from contact with said gases.

6. The seal assembly according to claim 4 wherein said seal ring comprises annealed copper.

7. The seal assembly according to claim 1 wherein said rotary valve comprises a substantially cylindrical rotor wherein said rotor comprises an axis of rotation when in operation, and wherein said rotation confers substantial lateral force upon said seal assembly, and wherein said reinforcement region substantially secures said seal assembly against said substantial lateral force.

8. The seal assembly according to claim 1 wherein said seal ring expands thermally for sealing engagement of said seal assembly to said combustion chamber.

9. The seal assembly according to claim 2 wherein said seal body comprises graphite comprising compressibility of at least 35,000 psi and heat tolerance to at least 350° C.

10. The seal assembly according to claim 1 further comprising a top orifice comprising a first area and a bottom orifice comprising a second area, wherein said first area is less than said second area.

11. The seal assembly according to claim 10 wherein said first area is sufficiently less than said second area to create a pressure differential during the compression cycle of the engine.

12. A seal assembly for use with a rotary valve for an internal combustion engine comprising at least one substantially cylindrical rotor and at least one combustion chamber, said seal assembly comprising a seal body and a seal ring, said seal ring comprising one or more materials which aid in dissipation of heat, and wherein said seal ring comprises one or more reinforcement regions configured to aid in dissipation of heat.

13. A seal assembly for use with a rotary valve for an internal combustion engine comprising at least one rotor and at least one combustion chamber wherein said rotor comprises an axis of rotation when in operation, wherein said axis of rotation confers a lateral force upon said seal assembly in a first direction, and wherein said seal assembly comprises an anchor securing said seal assembly in a second direction, substantially opposite said first direction.

14. The seal assembly according to claim 13 wherein said internal combustion engine comprises an engine head and said anchor comprises a yoke substantially surrounding said seal assembly and affixed to said engine head.

15. The seal assembly according to claim 14 wherein said lateral force comprises a lateral force axis and said anchor comprises at least one pivot point.

16. A rotary valve assembly for use with an internal combustion engine, said assembly comprising a rotor disposed within a casing, a gap between said rotor and said casing, and a lubricious compressible material disposed within said gaps wherein said material permits lubricant-free, sliding engagement between said rotor and casing.

17. The assembly according to claim 16 wherein said compressible material comprises graphite foil.

18. The assembly according to claim 16 wherein said compressible material substantially prevents the travel of gases through said gap.

19. The assembly according to claim 16 wherein said compressible material is significantly thermally conductive.

20. The assembly according to claim 16 wherein said compressible material comprises one or more reinforcement materials.

21. The assembly according to claim 16 wherein said compressible material is at least 30% compressible.

22. The assembly according to claim 16 wherein said compressible material is configured in a plurality of sheets wherein said sheets may be compressed or uncompressed.

23. The assembly according to claim 22 wherein said rotor comprises a length and an axis disposed along said length and wherein said sheets are disposed along said axis.

24. The assembly according to claim 22 wherein the dimensions of said sheets are selected according to the formula $c = 2\sqrt{h(2r-h)}$ and $\theta = 2a \sin(c/2r)$ and $360/\theta$Number of segments.

25. The assembly according to claim 16 wherein said gap and said compressible material permit thermal expansion of said rotor.

26. The assembly according to claim 16 wherein said compressible material is sufficiently naturally lubricious to permit dry sliding engagement of said rotor with said compressible material.

27. The rotary valve assembly according to claim 16 wherein said assembly comprises at least one seal assembly and said rotor comprises an outer surface, wherein said at least one seal assembly comprises sufficient natural lubricity to permit dry sliding engagement with said outer surface.

28. A rotary valve assembly for use with an internal combustion engine comprising: at least one combustion chamber comprising at least one combustion chamber port comprising a first geometry;
at least one substantially cylindrical rotor comprising at least one rotor port comprising a second geometry for at least partial intermittent mating with said combustion chamber port to define a valve comprising a maximum valve area and a maximum valve duration;
means for adjusting said assembly in order to vary said maximum valve area and said maximum valve duration;
wherein said first and second geometries are selected to achieve a desired curve of the relationship between said maximum valve area and said maximum valve duration during operation of said valve.

29. The rotary valve assembly according to claim 28 further comprising a seal assembly wherein said seal assembly comprises a top orifice comprising a first area and a bottom orifice comprising a second area, wherein said first area is less than said second area.

30. The rotary valve assembly according to claim 29 wherein said first area is sufficiently less than said second area to create a pressure differential during the compression and combustion cycles of the engine.

31. The assembly according to claim 28 wherein said first and second geometries are selected in order to optimize volumetric efficiency and wherein said volumetric efficiency is optimized dynamically via said means for adjusting said assembly.

32. The assembly according to claim 28 wherein said means for adjusting said assembly permits selective reversible adjustment of an engine between an Atkinson cycle and an Otto cycle.

* * * * *